United States Patent
Endo et al.

(10) Patent No.: US 6,856,854 B2
(45) Date of Patent: Feb. 15, 2005

(54) NUMERICAL CONTROL DEVICE FOR A MACHINE TOOL

(75) Inventors: Nobuyuki Endo, Shizuoka (JP); Noriyuki Yazaki, Shizuoka (JP); Katsuhiro Shinomiya, Shizuoka (JP)

(73) Assignee: Star Micronics Co., Ltd., Shizuoka (JP)

( * ) Notice: Subject to any disclaimer, the term of this patent is extended or adjusted under 35 U.S.C. 154(b) by 0 days.

(21) Appl. No.: 10/400,227

(22) Filed: Mar. 27, 2003

(65) Prior Publication Data

US 2003/0187542 A1 Oct. 2, 2003

(30) Foreign Application Priority Data

Mar. 27, 2002 (JP) .................................... P.2002-088506
Feb. 21, 2003 (JP) .................................... P.2003-043751

(51) Int. Cl.[7] ............................................ G06F 19/00
(52) U.S. Cl. .................... 700/186; 700/114; 700/128; 700/192
(58) Field of Search ............................... 700/114, 128, 700/186, 192, 178; 408/13, 14

(56) References Cited

U.S. PATENT DOCUMENTS

| | | | | |
|---|---|---|---|---|
| 3,701,888 A | * | 10/1972 | McDaniel | 318/562 |
| 4,272,818 A | * | 6/1981 | McDaniel | 700/66 |
| 4,400,118 A | * | 8/1983 | Yamakage et al. | 408/3 |
| 4,543,635 A | * | 9/1985 | Joo et al. | 700/160 |
| 4,561,050 A | * | 12/1985 | Iguchi et al. | 700/176 |
| 4,780,654 A | * | 10/1988 | Shoji et al. | 318/434 |
| 4,933,868 A | * | 6/1990 | McMurtry | 700/160 |
| 5,084,660 A | * | 1/1992 | Sasaki et al. | 318/569 |
| 5,173,648 A | * | 12/1992 | Kawamura et al. | 318/568.13 |
| 5,184,053 A | * | 2/1993 | Maruo et al. | 318/571 |
| 5,521,830 A | * | 5/1996 | Saito | 700/192 |
| 6,219,898 B1 | * | 4/2001 | Kubanek et al. | 29/525.06 |
| 6,246,201 B1 | | 6/2001 | Aderek et al. | |
| 2001/0029404 A1 | * | 10/2001 | Sugiyama et al. | 700/160 |

FOREIGN PATENT DOCUMENTS

DE 199 34 044 A1 1/2001
JP 2001-170843 6/2001

OTHER PUBLICATIONS

Patent Abstracts of Japan; Publication No. 2001–170843; Jun. 26, 2001, 2 pgs.
European Search Report dated Jul. 2, 2004 (3 pages).

* cited by examiner

Primary Examiner—Albert W. Paladini
Assistant Examiner—Carlos R. Ortiz
(74) Attorney, Agent, or Firm—Osha & May L.L.P.

(57) ABSTRACT

A numerical control device for a machine tool switching two reference axes comprising switching timing determining means for determining a timing for switching the moving position definition on the basis of the first reference axis and the moving position definition on the basis of the second reference axis; and reference axis switching means for switching, in response to the switching timing determining means, the moving position definition on the basis of the first reference axis and the moving position definition on the basis of the second reference axis.

5 Claims, 16 Drawing Sheets

FIG. 2A

| ACCUMULATED NUMBER OF ROTATIONS (θ) | MOVING POSITION OF WORKPIECE (Zp) | MOVING POSITION OF TOOL (Xp) | FLAG |
|---|---|---|---|
| ⋮ | ⋮ | ⋮ | ⋮ |
| 200 | 1 | 4 | |
| 350 | 3 | 4 | |
| 400 | 4 | 5 | F1 |
| 780 | 12 | 5 | F2 |
| 800 | 12 | 6 | |
| ⋮ | ⋮ | ⋮ | ⋮ |

FIG. 2B

F1 POSITION DATA TABLE FOR DRILLING OPERATION

| ACCUMULATED NUMBER OF ROTATIONS OF TOOL (θt) | MOVING POSITION OF TOOL (Xpt) | MOVING POSITION OF TOOL (Ypt) |
|---|---|---|
| ⋮ | ⋮ | ⋮ |
| 1000 | 10 | 10 |
| 1050 | 15 | 13 |
| 1100 | 20 | 15 |
| 1150 | 22 | 15 |
| 1200 | 24 | 15 |
| ⋮ | ⋮ | ⋮ |

FIG. 2C

F2 POSITION DATA TABLE FOR MILLING OPERATION

| ACCUMULATED NUMBER OF ROTATIONS OF TOOL (θt) | MOVING POSITION OF TOOL (Xpt) | MOVING POSITION OF TOOL (Ypt) |
|---|---|---|
| ⋮ | ⋮ | ⋮ |
| 5000 | 10 | 9 |
| 5050 | 15 | 22 |
| 5100 | 20 | 15 |
| 5150 | 20 | 17 |
| 5200 | 20 | 19 |
| ⋮ | ⋮ | ⋮ |

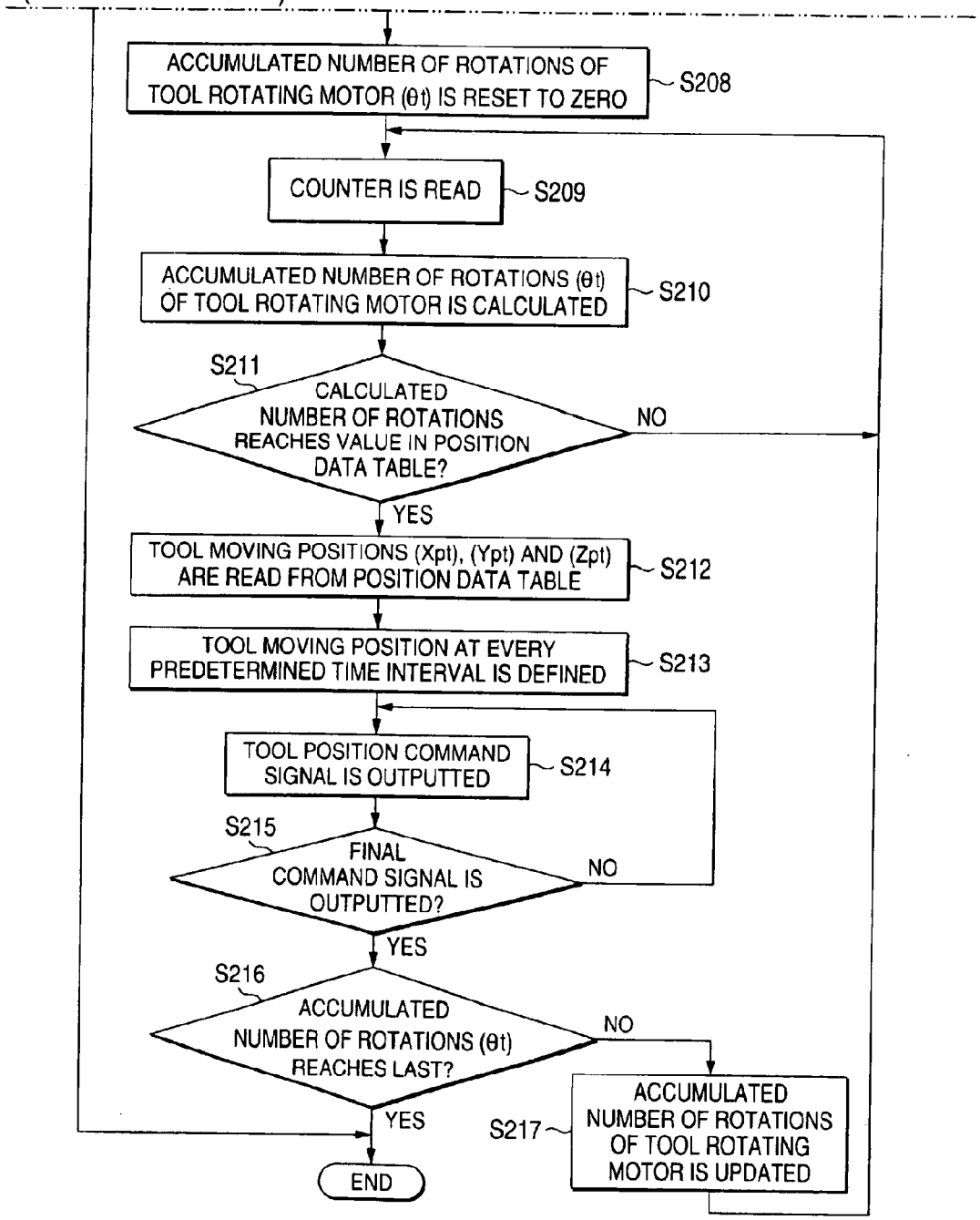
(FIG. 4 CONTINUED)

FIG. 9

```
CRVTBL_1
CH1
.
.
.
TOP
T101
T0
.
.
.
DO G0 X₀*Y.*Z.***
M20
LEAD123(1)
M82
LEAD12(2)
M83
LEAD12(3)
M80
T101
.
.
EM80
.
M99
.
.
M30
```

```
CRVTBL_3
CH3
.
.
.
TOP
T101
T0
.
.
.
DO G0 X₀*Y.*Z.***
M20
LEAD123(1)
M99
.
.
M30
```

```
CRVTBL_2
CH2
.
.
.
TOP
T101
T0
.
.
.
DO G0 X₀*Y.*Z.***
M20
LEAD123(1)
M82
LEAD12(2)
M83
LEAD12(3)
M99
.
.
M30
```

```
SUB CRVTBL_1
INI_Tab_X=101
INI_Tab_Y=0
INI_Tab_Z=103
INI_TabAux1=601
INI_TabAux2=611
INI_TabSpi=201
INI_TabC1=104
INI_TabC2=105
INI_TabTool=301
INI_TabComd=401
INI_TabThread=1
INITS
CTABDEF
.
.
.
END
.
..
CTABDEF
.
.
.
END
```

```
Sub INITS
.
.
.
.
```

NUMERICAL CONTROL DEVICE FOR A MACHINE TOOL

CROSS-REFERENCE TO RELATED APPLICATIONS

This application claims priority from Japanese Patent Application No. 2002-088506 filed on Mar. 27, 2002, and Japanese Patent Application No. 2003-043751 filed on Feb. 21, 2003.

BACKGROUND OF THE INVENTION

1. Field of the Invention

The present invention relates to a numerical control device for a machine tool for machining a workpiece into a desired shape by a tool by moving at least one of the workpiece and the tool with the workpiece rotated around a predetermined axis.

2. Description of the Related Art

In a conventional electronic-cam-controlled machine tool, a driving control apparatus of a machine tool comprises a pulse encoder mounted on a rotatable member (reference axis), storage means for storing an ever-changing rotational position by reading a pulse signal from the pulse encoder, and another storage means for storing a command position data of a moving axis set for every unit rotational position of the rotatable member. Such driving control apparatus generates an ever-changing moving command data for the moving axis according to the stored rotation position data and the stored command position data. It also generates a command speed data for the moving axis in synchronous with the rotational speed of the rotatable member according to the generated moving command data and the stored rotation position data, thereby controlling the position of a tool based on the generated moving command data and the generated command speed data.

Conventionally, as described above, the headstock and the tool post are driven and the moving axis is positionally controlled on the basis of a single reference axis. This is disclosed in JP-A-2001-170843.

There are some secondary operations requiring the main spindle to stop: a milling operation to form a plane on a workpiece by moving and rotating a tool, a drilling operation through the workpiece in a direction perpendicular to the main spindle, and a drilling operation at an offset position of the axial center of the main spindle. If the main spindle is set as the reference axis, such operations are disabled under electronic-cam control since any reference signal is not generated from the stopped main spindle.

The electronic cam control utilizes command position data of a moving axis respectively set for every unit rotational position of the main spindle, thereby achieving higher accuracy with higher speed. If the main spindle is stopped, a pulse signal is not generated, therefore command position data of a moving axis respectively set for every unit rotational position of the main spindle is not obtained, then a moving command data is not generated.

It may be an alternative that another member but the main spindle is used to generate a reference signal while the main spindle is stopped. It might, however, raise a problem of machining accuracy with a tool such as a rotary tool when the spindle rotation is stopped.

Further, a solution includes a signal of another reference axis which is independent of rotation of the main spindle. It may be, for example, a communicator for generating a timing signal at given intervals from the start of electronic cam control. This alternative, however, also would raise a problem of machining accuracy and machining speed. If the electronic cam control is switched upon request so that the communicator is used to generate a signal of the reference axis in synchronous with the rotational angle of the main spindle, the change of the reference signal would also raise a risk of machining accuracy.

SUMMARY OF THE INVENTION

An object of the present invention is to provide a numerical control device for a machine tool which allows a proper operation on a workpiece even under electronic cam control by properly switching two reference axes.

The present invention provides a machine tool for machining a workpiece into a desired shape by a tool by moving at least one of the workpiece and the tool with the workpiece rotated around a predetermined axis, comprising:

a first reference axis for generating a reference timing signal every predetermined rotational angle of the predetermined axis;

first position data storage means for storing position data set for a plurality of reference axis values on the basis of the first reference axis, the position data representing a moving position of at least one of the workpiece and the tool;

a second reference axis for generating a reference timing signal independently of rotation of the predetermined axis;

second position data storage means for storing position data set for a plurality of reference axis values on the basis of the second reference axis, the position data representing a moving position of at least one of the workpiece and the tool;

moving position defining means for defining a moving position of at least one of the workpiece and the tool by reading position data set for every reference axis value stored in one of the first position data storage means and the second position data storage means;

switching timing determining means for determining a timing for switching the moving position definition by the reference axis value on the basis of the first reference axis and the moving position definition by the reference axis value on the basis of the second reference axis; and reference axis switching means for switching, in response to the switching timing determining means, the moving position definition on the basis of the first reference axis and the moving position definition on the basis of the second reference axis.

Further in the machine tool of the present invention, the switching timing determining means brings the number of rotations of the predetermined axis into a given value after the reference axes are switched.

The machine tool of the present invention further comprises rotation stop presuming means for presuming that the predetermined axis stops rotation, and rotary tool driving means for controlling the rotary tool until it reaches a target number of rotations when it is presumed by the rotation stop presuming means that the predetermined axis has stopped rotation.

BRIEF DESCRIPTION OF DRAWINGS

FIG. 2A is an example of a position data table.

FIG. 2B is a position data table for drilling operation.

FIG. 2C is a position data table for milling operation.

FIG. 9 is a converted program to be executed in the second embodiment.

DETAILED DESCRIPTION OF THE INVENTION

The present invention will be described below in detail with reference to the accompanying drawings.

Figure 1:
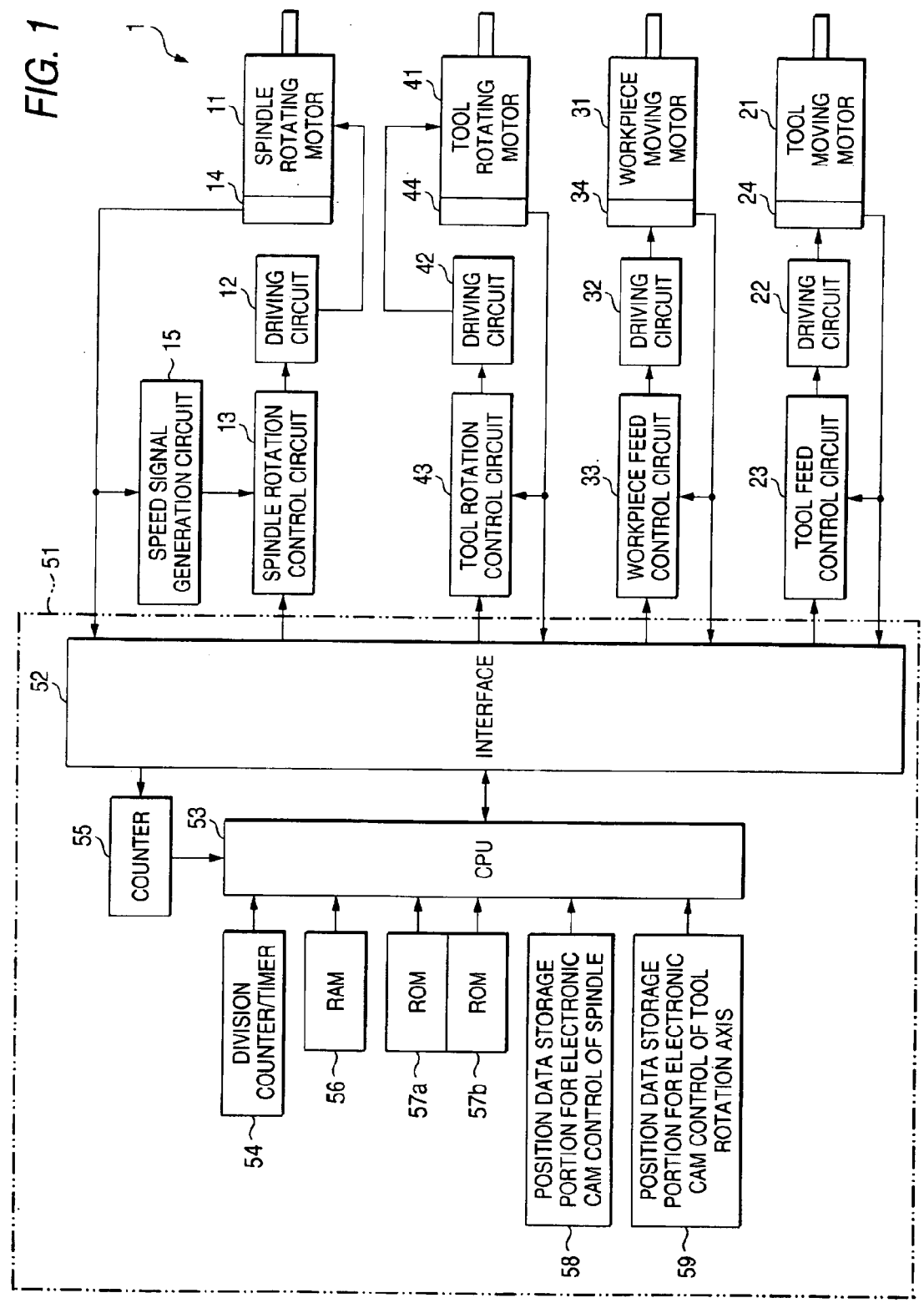
FIG. 1 is a block diagram showing a structure of a numerically controlled machine tool of the present invention.

FIG. 1 is a block diagram showing a structure of a numerically controlled machine tool 1 of the present invention. The machine tool 1 comprises a spindle rotating motor 11, a tool moving motor 21, a workpiece moving motor 31, a tool rotating motor 41, and a control unit 51 for driving the motors 11, 21, 31, and 41.

The spindle rotating motor 11 is connected to the control unit 51 via a driving circuit 12 and a spindle rotation control circuit 13 and adapted to rotate a spindle (not shown) where the workpiece is held. The spindle rotating motor 11 is provided with a pulse encoder 14 for detecting a rotation of the spindle rotating motor 11. The output of the pulse encoder 14 is connected to the control unit 51 and a speed signal generation circuit 15. The pulse encoder 14 generates a rotation detection signal in synchronous with rotation of the spindle rotating motor 11 (spindle) to transmit it to the control unit 51 and the speed signal generation circuit 15. The pulse encoder 14 constitutes part of the first reference axis as defined in the claims. The rotational center axis of the spindle rotating motor 11 constitutes the predetermined axis as defined in the claims. The speed signal generation circuit 15 converts the rotation detection signal into a spindle rotational speed signal representing a rotational speed of the spindle rotating motor 11 (spindle). The output of the speed signal generation circuit 15 is connected to the spindle rotation control circuit 13 to which the converted signal is inputted.

The spindle rotation control circuit 13 controls the workpiece (spindle) to rotate at a desired rotational speed on the basis of a clock signal generated by a clock signal generating circuit described later. Particularly, the spindle rotation control circuit 13 compares a spindle rotational speed command signal from the control unit 51 with the spindle rotational speed signal from the speed signal generating circuit 15, thereby generating a control signal according to the differential on the basis of the clock signal. The generated control signal is outputted to the driving circuit 12.

The driving circuit 12, in response to the control signal from the spindle rotation control circuit 13, controls power supply to the spindle rotating motor 11 to change the rotational speed thereof to a spindle rotational speed command value (described later). The driving circuit 12, the spindle rotation control circuit 13, and the speed signal generating circuit 15 constitute a feedback control system for the spindle rotating motor 11 (spindle) with respect to a rotational speed thereof.

The tool moving motor 21 moves a machining tool (cutting tool, rotary tool, etc.) in a direction (X-axis, Y-axis direction) perpendicular to the rotational center axis of the spindle rotating motor 11 and in a direction (Z-axis direction) parallel to the rotational center axis of the spindle rotating motor 11. The tool moving motor 21 is connected to the control unit 51 via a driving circuit 22, a tool feed control circuit 23, and an I/F 52. The tool moving motor 21 is provided with a pulse encoder 24 for detecting a rotation of the tool moving motor 21. The output of the pulse encoder 24 is connected to the tool feed control circuit 23. The pulse encoder 24 generates a rotational position signal every predetermined rotational angle of the tool moving motor 21 to transmit it to the tool feed control circuit 23.

The tool feed control circuit 23 recognizes an actual position of the tool in response to the rotational position signal, and compares the actual position of the tool with a tool position command signal sent from the control unit 51 via the I/F 52, thereby generating a tool driving signal as a result of the comparison. The tool driving signal is outputted to the driving circuit 22 to control power supply to the tool moving motor 21. The driving circuit 22 and the tool feed control circuit 23 constitute a feedback system for the tool with respect to the moving position thereof.

The workpiece moving motor 31 moves the workpiece, for example, in a direction (Z-axis direction) parallel to the rotational center axis of the spindle rotating motor 11. The workpiece moving motor 31 is connected to the control unit 51 via a driving circuit 32, a workpiece feed control circuit 33, and the I/F 52. The workpiece moving motor 31 is provided with a pulse encoder 34 for detecting a rotation of the workpiece moving motor 31. The output of the pulse encoder 34 is connected to the workpiece feed control circuit 33. The pulse encoder 34 generates a rotational position signal every predetermined rotational angle of the workpiece moving motor 31 to transmit it to the workpiece feed control circuit 33.

The workpiece feed control circuit 33 recognizes an actual position of the workpiece in response to the rotational position signal, and compares the actual position of the workpiece with a workpiece position command signal from the control unit 51 via the I/F 52, thereby generating a workpiece driving signal as a result of the comparison. The workpiece driving signal is outputted to the driving circuit 32 to control power supply to the workpiece moving motor 31. The driving circuit 32 and the workpiece feed control circuit 33 constitute a feedback system for the workpiece with respect to the moving position thereof.

The tool rotating motor 41 rotates a tool such as drill, tap, and milling cutter. The tool rotating motor 41 is connected to the control unit 51 via a driving circuit 42 and a tool rotation control circuit 43. The tool rotating motor 41 is provided with a pulse encoder 44 for detecting a rotation of the motor 41. The pulse encoder 44 constitutes part of the second reference axis as defined in the claims. The output of the pulse encoder 44 is connected to the control unit 51 via the I/F 52. The pulse encoder 44 generates a rotational position signal in synchronous with rotation of the motor 41 to transmit it to the control unit 51.

The tool rotation control circuit 43 compares the signal from the pulse encoder 44 and a tool rotational speed command signal from the control unit 51, thereby generating a control signal on the basis of a clock signal as a result of the comparison. The generated control signal is outputted to the driving circuit 42.

The driving circuit 42, in response to the control signal, controls power supply to the tool rotating motor 41 to change the rotational speed of the tool rotating motor 41 into the tool rotational speed command value. The driving circuit 42, the tool rotation control circuit 43, and the pulse encoder 44 constitute a feedback system for the tool rotating motor 41 with respect to the rotational speed thereof. The control unit 51 comprises, as shown in FIG. 1, a central processing unit (CPU) 53, a division counter/timer 54, a random access memory (RAM) 56, and a read only memory (ROM) 57a and 57b, a position data storage portion for electronic cam control of spindle 58, a position data storage portion for electronic cam control of tool rotation axis 59, and a counter 55.

The CPU 53 controls an entire signal processing of the control unit 51, constituting the moving position defining means as described in the claims. The counter 55 is connected to the I/F 52 to count the number of rotation detection signals from the pulse encoder 14 or the pulse encoder 44. The counter 55 is also connected to the CPU 53 to transmit the counted result thereto. The division counter/timer 54 generates a timing signal at a predetermined interval, for example four (4) millisecond. The generated timing signal is sent to the CPU 53. The interval of the timing signal is not limited to the above example. It may be any appropriate value according to the capability or performance of the CPU 53, the pulse encoder 14, and the motors 11, 21, 31, and 41.

The position data storage portion for electronic cam control of spindle 58 stores workpiece position data and tool position data for a plurality of count values of the rotation detection signals counted by the counter 55. It comprises a memory such as a RAM. The position data storage portion for electronic cam control of spindle 58 stores the workpiece position data and the tool position data in the form of a position data table T as shown in FIG. 2A.

The position data table T shows accumulated number of rotations (θ) of the spindle rotating motor 11 calculated from the count value of rotation detection signals. The count value itself may be used instead. The position data storage portion for electronic cam control of spindle 58 constitutes the first position data storage means as defined in the claims.

In FIG. 2A, the position data table T sets a moving position (Zp) of the workpiece 2 and a moving position (Xp) of the tool 3 as respective position data at each of accumulated number of rotations (θ) of the spindle rotating motor 11. For example, the moving position (Zp) of the workpiece 2 is "1" and the moving position (Xp) of the tool 3 is "4" when the accumulated number of rotations (θ) is "200". The position data storage portion 58 is connected to the CPU 53. The moving position (Zp) of the workpiece 2 and the moving position (Xp) of the tool 3 is transmitted to the CPU 53 as workpiece position data and tool position data respectively.

Figure 6A:
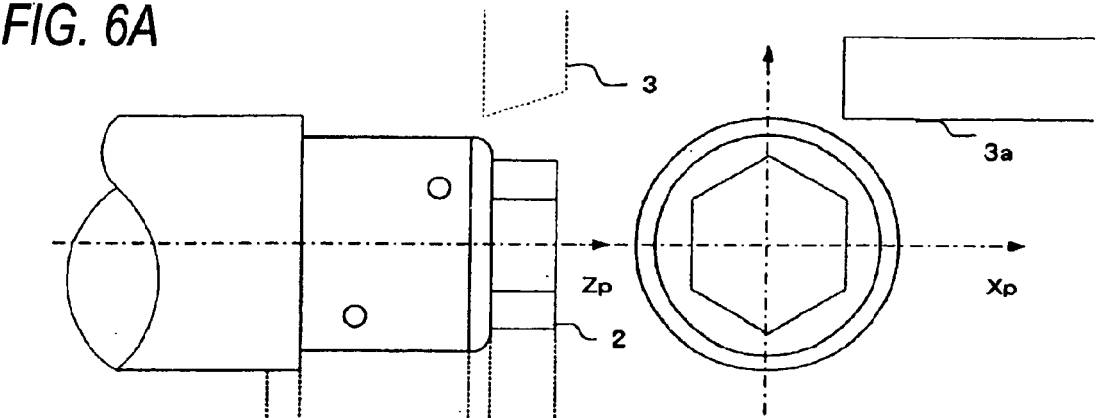
FIG. 6A shows an example of operation on a workpiece.
Figure 6B:
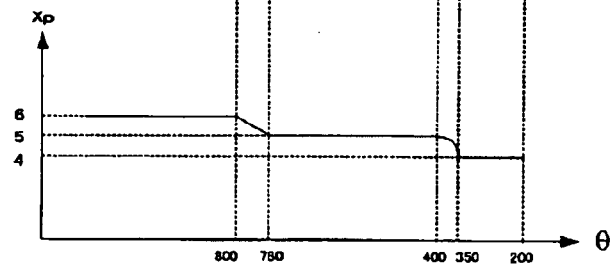
FIG. 6B shows a movement track of the tool in the X-axis direction.
Figure 6C:
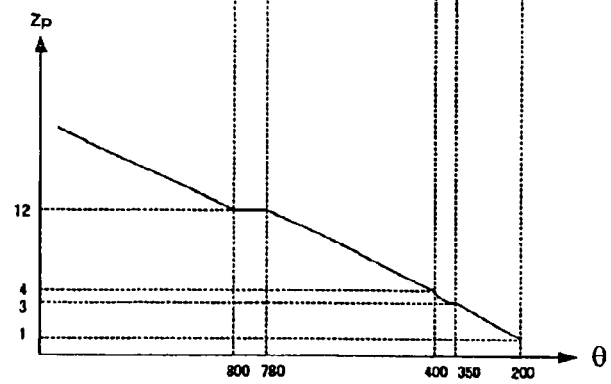
FIG. 6C shows a movement track of the workpiece in the Z-axis direction.

The position data table T as shown in FIG. 2A achieves a movement track of the workpiece 2 in the Z-axis direction and a movement track of the tool 3 in the X-axis direction as shown in FIGS. 6C and 6B respectively. FIG. 6C shows a movement track of the workpiece 2 in the Z-axis direction for the accumulated number of rotations (θ) of the spindle rotating motor 11. While the accumulated number of rotations (θ) increases from "200" to "350", the workpiece 2 moves from "1" to "3". While the accumulated number of rotations (θ) increases from "350" to "400", the workpiece 2 moves from "3" to "4". FIG. 6B shows a movement track of the tool 3 in the X-axis direction for the accumulated number of rotations (θ) of the spindle rotating motor 11. While the accumulated number of rotations (θ) increases from "200" to "350", the tool 3 remains at "4". While the accumulated number of rotations (θ) increases from "350" to "400", the tool 3 moves from "4" to "5". Movement of the workpiece 2 and the tool 3 along the track defined by the position data table T causes the workpiece 2 to be machined by the tool 3 into the shape as shown in FIG. 6A. In this embodiment, the rotational speed of the spindle rotating motor 11 is kept constant for the periods from "200" to "350", from "350" to "400", and from "400" to "780" respectively. The rotational speed may be appropriately selected depending on material of the workpiece 2 and others.

The position data table Tt as shown in FIG. 2B sets moving positions (Xpt) and (Ypt) of a rotary tool 3a for the plurality of accumulated number of rotations (θt) of the tool rotating motor 41. The tool position data (Xpt) is "10" and (Ypt) is "10" when the accumulated number of rotations (θt) is "1000". The position data storage portion for electronic cam control of tool rotation axis 59 is connected to CPU 53. The moving positions of the tool 3a (Xpt) and (Ypt) are transmitted to the CPU 53 as tool position data. The moving position of the tool 3a (Zpt) (not shown) is also transmitted if a grooving is done in the axial direction. The position data storage portion for electronic cam control of tool rotation axis 59 constitutes the second position data storage means as defined in the claims.

Figure 7A:
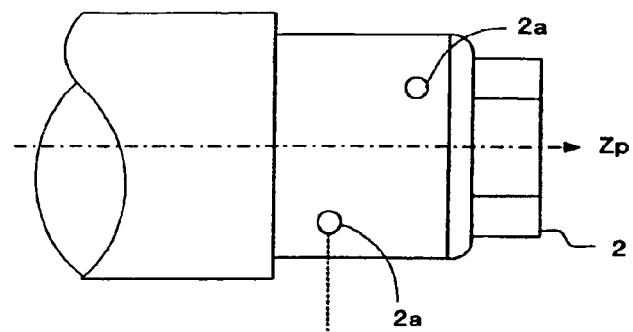
FIG. 7A shows an example of operation on a workpiece.
Figure 7B:
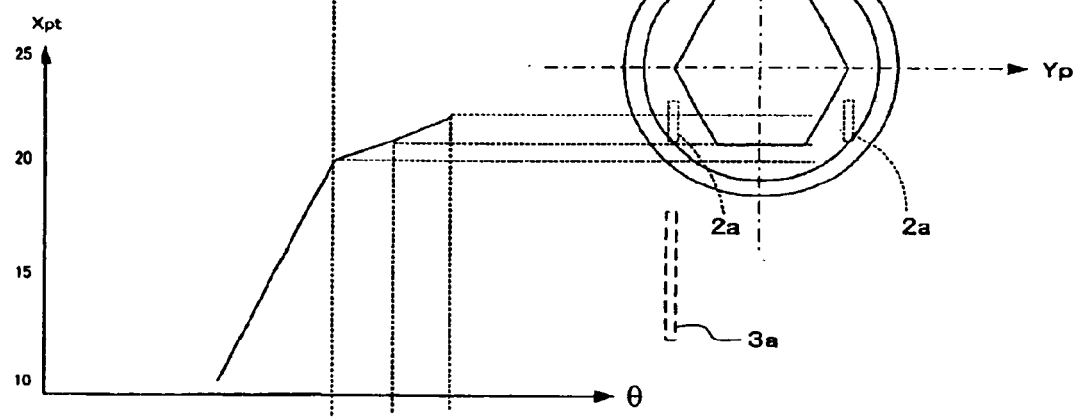
FIG. 7B shows a movement track of the tool in the X-axis direction.
Figure 7C:
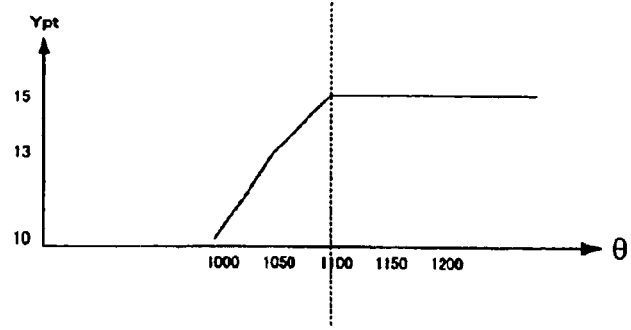
FIG. 7C shows a movement track of the workpiece in the Y-axis direction.

The position data table Tt as shown in FIG. 2B achieves a movement track of the tool 3a in the X-axis direction and in the Y-axis direction as shown in FIGS. 7B and 7C respectively. FIG. 7C shows a movement track of the tool 3a in the Y-axis direction for the accumulated number of rotations (θt) of the tool rotating motor 41. While the accumulated number of rotations (θt) increases from "1000" to "1050", the tool 3a moves from "10" to "13". FIG. 7B shows a movement track of the tool 3a in the X-axis direction for the accumulated number of rotations (θt) of the tool rotating motor 41. While the accumulated number of rotations (θt) increases from "1000" to "1050", the tool 3a moves from "10" to "15". While the accumulated number of rotations (θt) increases from "1050" to "1100", the tool 3a moves from "15" to "20". Movement of the tool 3a along the track defined by the position data table Tt causes the workpiece 2 to be drilled by the tool 3a to form a hole 2a as shown in FIG. 7A. In this embodiment, the rotational speed of the tool rotating motor 41 is kept constant for the periods from "1000" to "1050", from "1050" to "1100", from "1100" to "1150", and from "1150" to "1200" respectively. The rotational speed may be appropriately selected depending on material of the workpiece 2 and others.

The position data table Tt as shown in FIG. 2C sets moving positions (Xpt) and (Ypt) of the rotary tool 3a (end mill, ball mill, etc.) for the plurality of accumulated number of rotations (θt) of the tool rotating motor 41. The tool position data (Xpt) is "10" and (Ypt) is "9" when the accumulated number of rotations (θt) is "5000". The position data storage portion for electronic cam control of tool rotation axis 59 is connected to CPU 53. The moving positions of the tool 3a, (Xpt) and (Ypt) are transmitted to the CPU 53 as tool position data. The moving position of the tool 3a (Zpt) (not shown) is also transmitted if a milling operation is done in the axial direction.

Figure 8A:
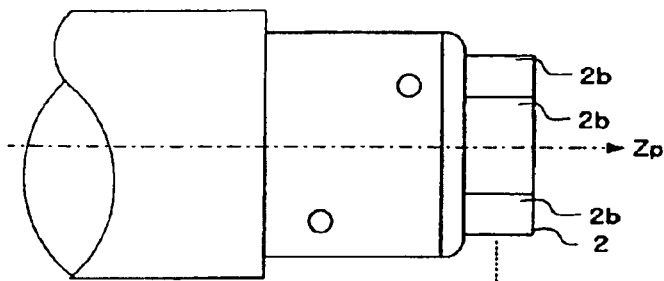
FIG. 8A shows an example of operation on a workpiece.
Figure 8B:
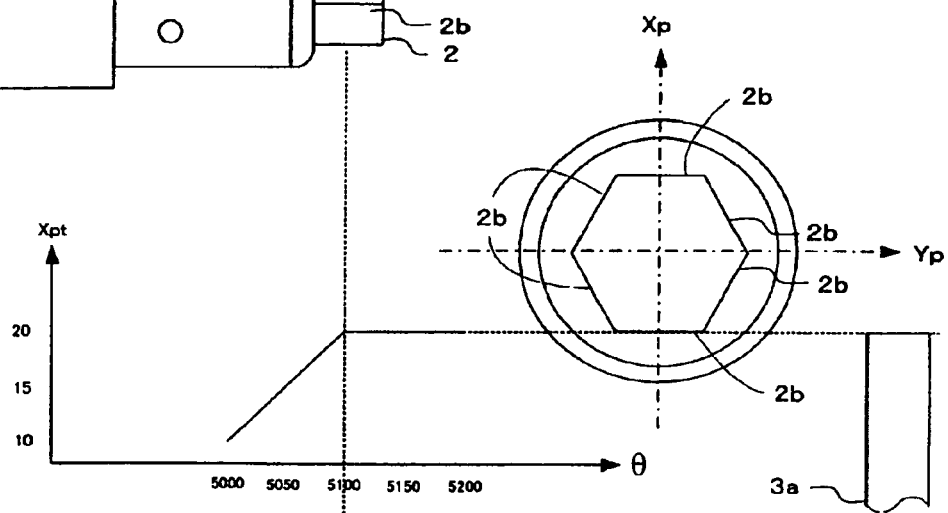
FIG. 8B shows a movement track of the tool in the X-axis direction.
Figure 8C:
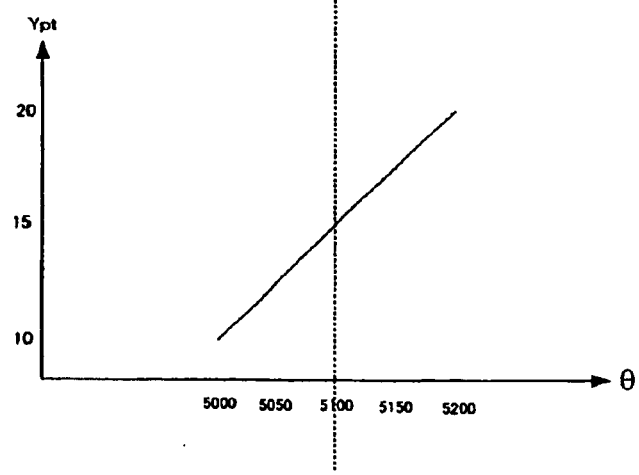
FIG. 8C shows a movement track of the workpiece in the Y-axis direction.

The position data table Tt as shown in FIG. 2C achieves a movement track of the tool 3a in the X-axis direction and in the Y-axis direction as shown in FIGS. 8B and 8C respectively. FIG. 8C shows a movement track of the tool 3a in the Y-axis direction for the accumulated number of rotations (θt) of the tool rotating motor 41. While the accumulated number of rotations (θt) increases from "5000" to "5050", the tool 3a moves from "9" to "22". FIG. 8B shows a movement track of the tool 3a in the X-axis direction for the accumulated number of rotations (θt) of the tool rotating motor 41. While the accumulated number of rotations (θt) increases from "5000" to "5050", the tool 3a moves from "10" to "15". While the accumulated number of rotations (θt) increases from "5050" to "5100", the tool 3a moves from "15" to "20". Movement of the tool 3a along the track defined by the position data table Tt causes the workpiece 2 to be milled by the tool 3a to form a plane 2b as shown in FIG. 8A. In this embodiment, the rotational speed of the tool rotating motor 41 is kept constant for the periods from "5000" to "5050", from "5050" to "5100", from "5100" to "5150", and from "5150" to "5200" respectively. The rotational speed may be appropriately selected depending on material of the workpiece 2 and others.

The ROM 57c stores various processing programs, comprising a moving speed characteristics storage portion 57b for storing moving speed characteristics of the workpiece and the tool. The moving speed characteristics storage portion 57b stores a plurality of moving speed characteristics in the form of a data table or a function expression. It is connected to the CPU 53 and the stored characteristics are read by the CPU 53.

Figure 3:
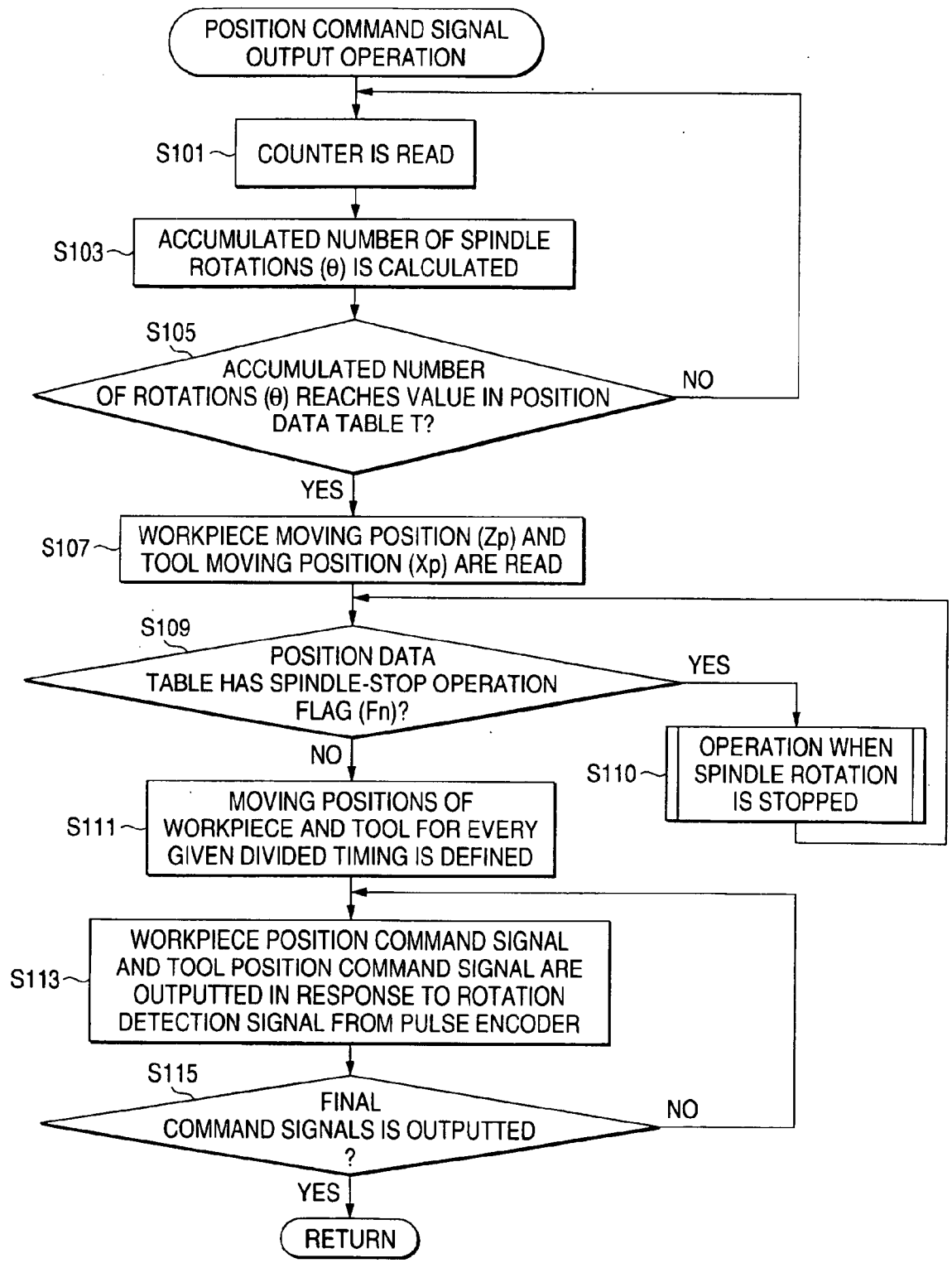
FIG. 3 is a flowchart showing an output operation of the tool position command signal and the workpiece position command signal from the CPU53.

The I/F 52 outputs a workpiece position command signal to the workpiece feed control circuit 33. The workpiece position command signal represents a moving position of the workpiece defined by the CPU 53. The I/F 52 also outputs a tool position command signal to the tool feed control circuit 23. The tool position command signal represents a moving position of the tool defined by the CPU 53. The I/F 52 also outputs a spindle rotating speed command signal to the spindle rotation control circuit 13. The spindle rotating speed command signal represents the rotating speed of the spindle calculated and defined by the CPU 53. Rotation detection signals from the pulse encoders 14, 24, 34, and 44 are input to the CPU 53 and the counter 55 via the I/F 52. The RAM 56 temporarily and readably stores the calculation results by the CPU 53, FIG. 3 is a flowchart showing an output operation of the tool position command signal and the workpiece position command signal from the CPU 53 (control unit 51).

In S101, the CPU 53 reads the count value by the counter 55 of rotation detection signals from the pulse encoder 14.

In S103, the CPU 53 calculates an accumulated number of rotations (θ) of the spindle rotating motor 11 from the count value.

In S105, it is determined whether the accumulated number of rotations (θ) reaches the value in the position data table T. If it reaches the set value, the process goes to S107. If not yet, the process returns to S101.

In S107, the CPU 53 reads the moving position (Zp) of the workpiece and the moving position (Xp) of the tool at the accumulated number of rotations (θ) and those at the next accumulated number of rotations (θ) from the position data table T. The CPU 53 also reads a spindle-stop operation flag (Fn) if any.

In S109, it is determined whether the position data table T has a spindle-stop operation flag (Fn) where "n" is an identification number of an electronic cam data table for the spindle stop operation. If there exist a flag (Fn), the process goes to S110.

In S110, the CPU 53 calculates moving positions (Xp), (Yp), and (Zp) of the tool for every given divided timing on the basis of the electronic cam data table (position data table) identified by "n" as shown in FIG. 2B and FIG. 2C. The details are described later. When the calculation in S110 is completed, the process returns to S109.

If there exist no flag (Fn) in S109, the process goes to S111.

In S111, the CPU defines moving positions of the workpiece and the tool for every given divided timing.

The moving position of the workpiece is defined in the following manner. The moving position (Zp) of the workpiece 2 at the reached accumulated number of rotations (θ) is set as a start point. The moving position (Zp) of the workpiece 2 at the next accumulated number of rotations (θ) is set as an end point. On the basis of timing signals of four (4) milliseconds from the division counter/timer 54, the moving positions of the workpiece 2 at every interval of four (4) milliseconds are respectively defined as the workpiece 2 moves from the start point to the end point along the track running through the points set in the position data table T. The defined moving positions are temporarily stored in the RAM 56. For example, in reference to the position data table T in FIG. 2A, the moving position (Zp) of the workpiece is "1" when the accumulated number of rotations (θ) is "200". The moving position (Zp) of the workpiece is "3" at the accumulated number of rotations (θ) is "350". The moving positions of the workpiece 2 at every interval of four (4) milliseconds are respectively defined as the workpiece 2 moves from "1" to "3". The positions at every four (4) milliseconds are defined to draw a track interpolating the interval between the points set in the position data table T.

The moving position of the tool is calculated in the following manner. The moving position (Xp) of the tool 3 at the reached accumulated number of rotations (θ) is set as a start point. The moving position (Xp) of the tool 3 at the next accumulated number of rotations (θ) is set as an end point. On the basis of timing signals of four (4) milliseconds from the division counter/timer 54, the moving positions of the tool 3 at every interval of four (4) milliseconds are respectively defined as the tool 3 moves from the start point to the end point along the track running through the points set in the position data table T. The defined moving positions are temporarily stored in the RAM 56. For example, in reference to the position data table T in FIG. 2A, the moving position (Xp) of the tool is "4" when the accumulated number of rotations (θ) is "350". The moving position (Xp) of the tool is "5" at the accumulated number of rotations (θ) is "400". The moving positions of the tool 3 at every interval of four (4) milliseconds are respectively defined as the tool 3 moves from "4" to "5". The positions at every four (4) milliseconds are defined to draw a track interpolating the interval between the points set in the position data table T.

In S113, the CPU 53 outputs a workpiece position command signal to the workpiece feed control circuit 33, representing the moving position of the workpiece stored in the RAM 56. The CPU 53 also outputs a tool position command signal to the tool feed control circuit 23, representing the moving position of the tool stored in the RAM 56. The workpiece position command signal and the tool position command signal are outputted in response to a rotation detection signal from the pulse encoder 14. Particularly, the workpiece position command signal and the tool position command signal are outputted when the rotational angle of the spindle rotating motor 11 reaches the angle equivalent to 4 (four) milliseconds at constant speed.

In S115, it is determined whether a workpiece position command signal and a tool position command signal corresponding to the final moving positions of the positions defined in S111 are respectively outputted. If not yet, the process returns to S113 where a workpiece position command signal and a tool position command signal are outputted whenever the rotational angle of the spindle rotating motor 11 reaches the angle equivalent to 4 (four) milliseconds. On the other hand, if those signals corresponding to the final positions are outputted, the process returns to S101.

Figure 4:
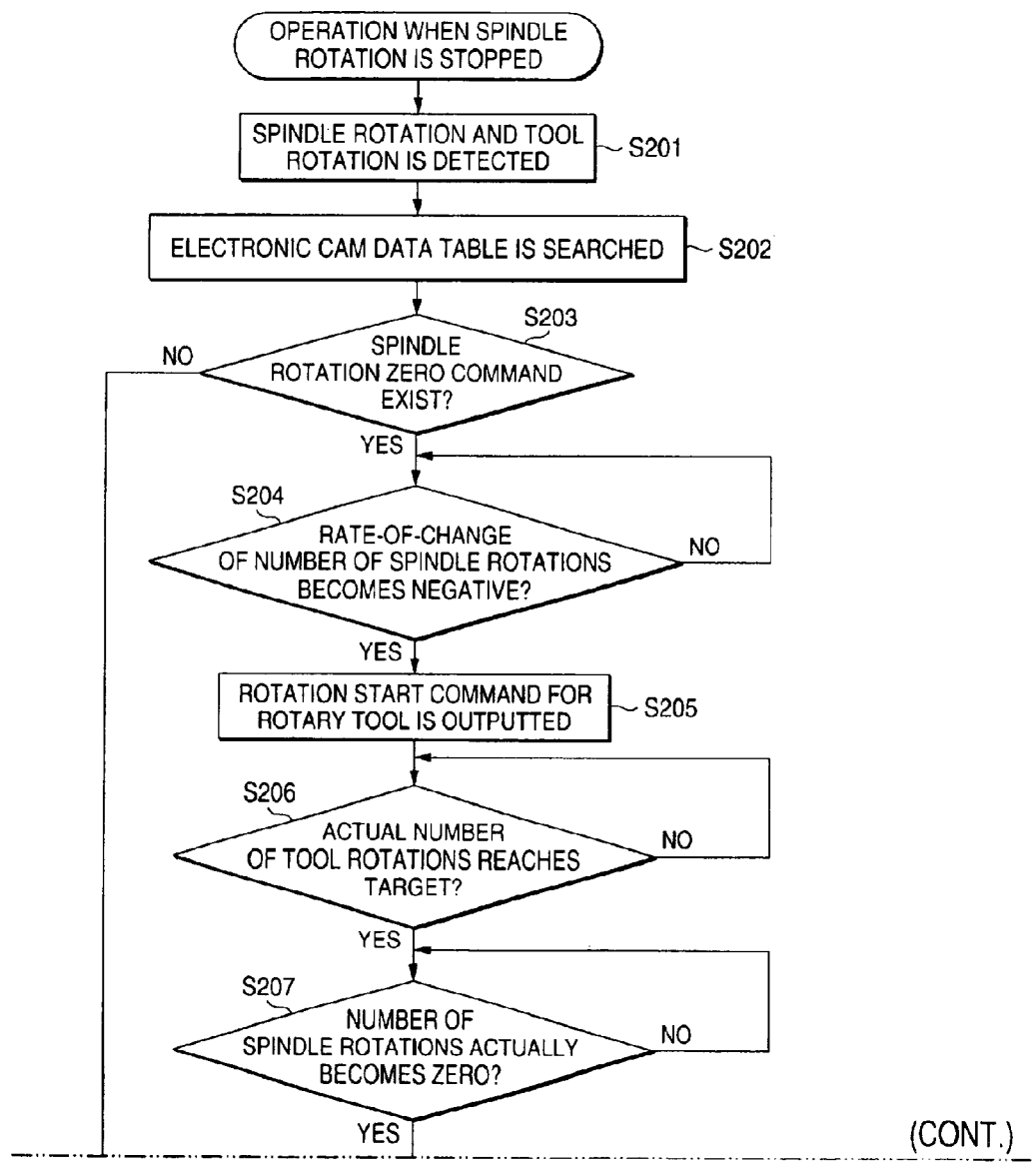
FIG. 4 is a subroutine of FIG. 3 showing an output operation of the tool position command signal and the workpiece position command signal when spindle rotation is stopped.

FIG. 4 is a subroutine of S110 in FIG. 3, showing the operation of the CPU 53 (control unit 51) when the spindle rotation is stopped. Particularly, the description refers to an output operation of the tool position command signal and the workpiece position command signal. The explanation of the others such as a spindle rotating speed command signal is omitted as far as they are conventionally known.

In S201, the CPU 53 detects rotation of the spindle and the tool by the pulse encoder 14 mounted on the spindle rotating motor 11 and the pulse encoder 44 mounted on the tool rotating motor 41 respectively.

In S202, the CPU 53 searches the electronic cam data stored in the position data storage portion 58 for a command bringing the number of rotations of the spindle to zero. The search result is stored in the RAM 56.

In S203, it is determined whether there exist a command bringing the number of rotations of the spindle to zero. If no, the process returns to the S109 of the main routine (FIG. 3). This determination is done to prevent an operation in case a flag (Fn) is wrongly described in the electronic-cam data table. The Flag (Fn) may be automatically described by a programming tool or may be manually described by the operator.

On the other hand, in S203, if there exist such a command, the process goes to S204.

In S204, it is determined whether the rate-of-change of the number of spindle rotations becomes negative. If it is not yet, the process returns to S204 since it means that the operation is not yet completed or the number of spindle rotations is not yet decreased. On the other hand, if it is negative, the process goes to S205.

In S205, the CPU 53 issues an rotation start command for a rotary tool to the tool rotation control circuit 53 via the I/F 52.

In S206, it is determined whether the actual number of tool rotations reaches the target number of rotations. Unless they are coincident, the process never advances. (The operations of S205 and S206 constitute the rotary tool driving means as defined in claim 2.) This determination stabilizes rotation angle signals from the pulse encoder 44 while allowing effective use of time to stop the rotation.

In S207, it is determined whether the number of spindle rotations actually becomes zero. If it is zero, the process goes to S208 to start an operation by use of the rotary tool 3a. S207 constitutes the switching timing determining means as defined in the claims.

Further, it is not necessarily required to wait until the spindle comes to a complete stop. The spindle needs be completely stopped only when the rotary tool 3a starts machining on the workpiece 2. Therefore, the S207 determination would further shorten the machining time if it is done early when the tool is standby in the proximity of the workpiece.

In S208, the accumulated number of rotations of the tool rotating motor (θt) is reset to zero.

In S209, the CPU 53 reads a count value by the counter 55 of the number of rotation detection signals from the pulse encoder 44.

In S210, the CPU 53 calculates the accumulated number of rotations (θt) of the tool rotating motor 41 (tool rotation axis) from the count value.

In S211, it is determined whether the calculated number of rotations (θt) reaches the value in the position data table Tt. If it reaches, the process goes to S212. If it does not yet, the process returns to S209. The steps from S208 to S215 described below constitute the reference axis switching means as defined in the claims.

In S212, the CPU 53 reads moving positions (Xpt), (Ypt), and (Zpt) of the tool 3a at the reached accumulated number of rotations (θt) and those at the next accumulated number of rotations (θt) from the position data table Tt.

In S213, the CPU 53 defines a moving position of the tool 3a at every predetermined time interval. The moving position of the tool is defined in the following manner.

The moving position (Xpt) of the tool 3a at the reached accumulated number of rotations (θt) is set as a start point. The moving position (Xpt) of the tool 3a at the next accumulated number of rotations (θt) is set as an end point. On the basis of timing signals of four (4) milliseconds from the division counter/timer 54, the moving positions of the tool 3a at every interval of four (4) milliseconds are respectively defined as the tool 3a moves from the start point to the end point along the track running through the points set in the position data table Tt. For example, in reference to the position data table T in FIG. 2B, the moving position (Xpt) of the tool 3a is "10" when the accumulated number of rotations (θt) is "1000". The moving position (Xpt) of the tool 3a is "15" at the accumulated number of rotations (θt) is "1050". The moving positions of the tool 3a at every interval of four (4) milliseconds are respectively defined as the tool 3a moves from "10" to "15". The positions at every four (4) milliseconds are defined to draw a track interpolating the interval between the points set in the position data table Tt. The moving positions (Ypt, Zpt) are defined similarly. The defined moving positions are stored in the RAM 56.

In S214, the CPU 53 outputs a tool position command signal to the tool feed control circuit 23. The tool position command signal represents the moving position of the tool stored in the RAM 56. The tool position command signal is outputted in response to a rotation detection signal from the pulse encoder 44. Particularly, the tool position command signal are outputted when the rotational angle of the tool rotating motor 41 reaches the angle equivalent to 4 (four) milliseconds at constant speed.

In S215, it is determined whether a tool position command signal corresponding to the final moving position of the positions defined in S213 has been outputted. If not yet, the process returns to S214 where a tool position command signal is outputted whenever the rotational angle of the tool rotating motor 41 reaches the angle equivalent to 4 (four) milliseconds. On the other hand, if the signal corresponding to the final position has been outputted, the process goes to S216.

In S216, it is determined whether the accumulated number of rotations ($\theta$t) reaches the last one defining the end of operation by use of a rotary tool. If not, the process goes to S217.

In S217, the accumulated number of rotations of the tool rotating motor 41 is updated and the process returns to S209.

On the other hand, if the accumulated number of rotations reaches the last one in S216, the process returns to the main routine (S109 of FIG. 3).

A further preferred embodiment of the present invention is being described below.

The tool rotating motor 41 is likely suffered from roughness in motor rotation due to mainly variation in cutting load when the tool operates on the workpiece. Though such roughness would not be a problem in the spindle rotating motor 11 of a larger torque, it would affect a trigger condition in the tool rotating motor 41 of a smaller torque. Particularly, in the pulse encoder 44 mounted on the tool rotating motor 41, the number of generated rotation detection signals per unit of time is possibly varied. The count value by the counter varies per unit of time, therefore the accumulated number of rotations ($\theta$t) is wrongly calculated.

An example of possible problems is as follows. At the start of machining, a rapid load up on the tool rotating motor 41 makes motor rotation slow for a moment. Thereafter, as the motor rotation becomes drastically faster toward the target number of rotations, the count value sharply changes, rapidly accelerating the movement of the tool 3a. As the result, the product quality is deteriorated, or the life of the tool is shortened.

To prevent a variation in count value, a filter processing is effective to suppress a rapid change. The filter processing is available by software or by hardware. In case of hardware, a discrete circuit or IC circuit may be used. In case of software, the CPU 53 may execute a filter program.

Figure 5:
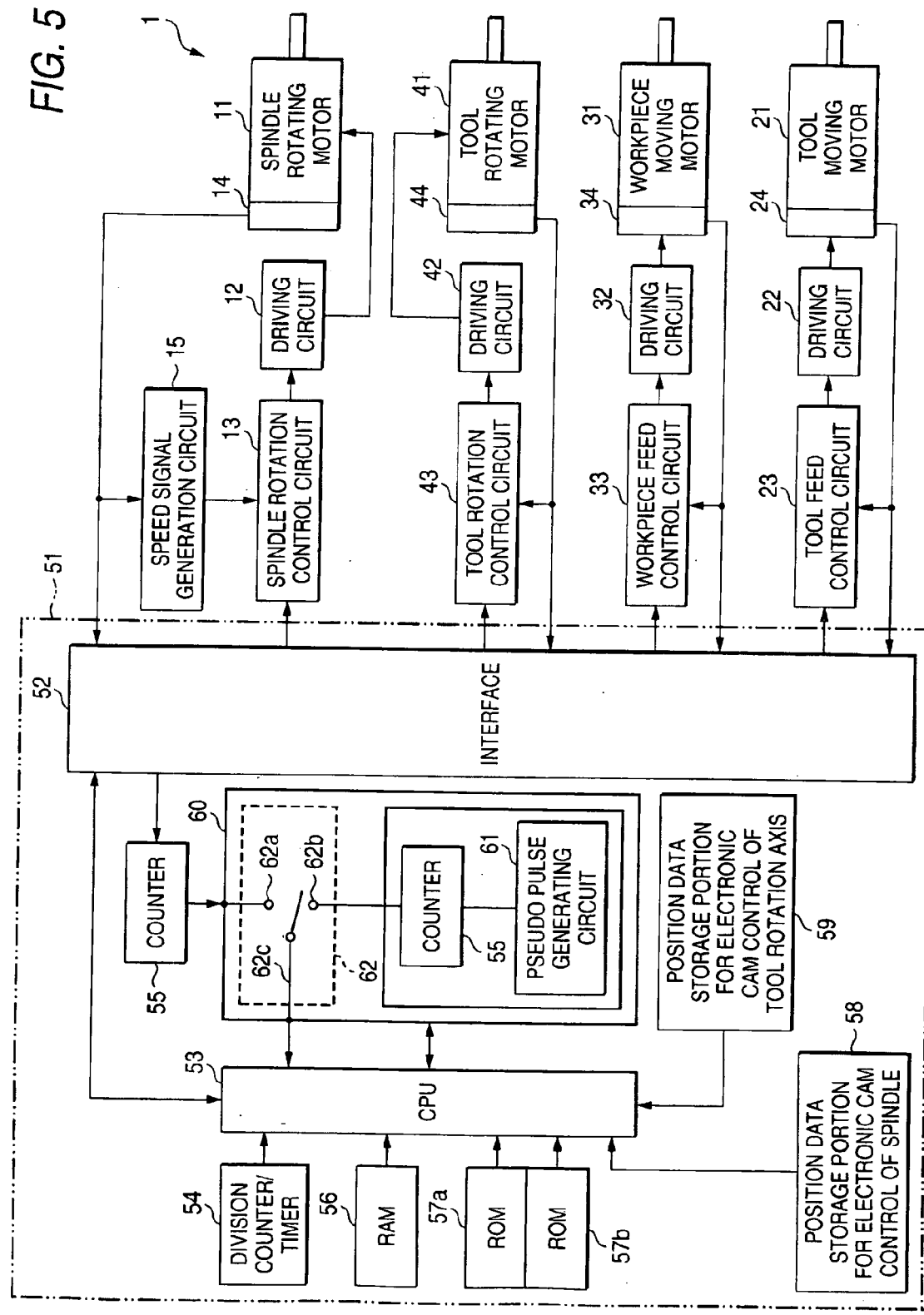
FIG. 5 is a block diagram showing a structure of a numerically controlled machine tool having a pseudo pulse generating circuit.

In the embodiment described above, the pulse encoder 44 mounted on the tool rotating motor 41 is used to obtain the accumulated number of rotations ($\theta$t). Instead, it may be possible to use an oscillating pulse generated by a pseudo pulse generating circuit 61 as shown in FIG. 5. FIG. 5 is different from FIG. 1 in that an input switching portion 60 is provided for selectively inputting one of the signal from the counter 55 and the signal from the pseudo pulse generating circuit 61 in response to an instruction from the CPU 53. The input switching portion 60 comprises a switch 62. The switch 62 comprises a terminal portion 62a connected to the counter 55, a terminal portion 62b connected to the pseudo pulse generating circuit 61, and switching piece 62c. The pseudo pulse generating circuit 61 is provided with another counter 55. The CPU 53 then receives an equivalent signal even from the pseudo pulse generating circuit 61. The pseudo pulse generating circuit 61 is adapted to receive the same command as that sent to the tool rotating control circuit 43 from the CPU 53, therefore it is able to generate an equivalent signal to that generated by the pulse encoder 44.

In case of a signal from the pulse encoder 44, a variation in rotation of the tool rotating motor 41 likely affects the count value of the accumulated number of rotations ($\theta$t). In case of a pseudo signal, however, there would be no influence on it since the signal is hypothetically generated. The accumulated number of rotations ($\theta$t) is properly obtained and therefore ideal tool moving positions (Xpt), (Ypt), and (Zpt) are obtained.

Another preferred embodiment of the present invention is being described referring to the drawings. The matters already explained in the first embodiment are being omitted.

In the first embodiment, a rotational angle of the tool rotating motor 41 is used as the reference instead of the spindle rotating motor 11 when the spindle rotation is stopped. In the second embodiment, a reference axis independent of spindle rotation is ordinarily used and rotation angle of the spindle motor is used as reference only for particular operations.

First, a converted program to be loaded into the numerical control device is being described referring to FIG. 9.

The program is a NC program part of which has been converted into an electronic cam program.

The converted program comprises a main program containing a NC code and an electronic cam control command, a sub program containing a position data table declaring a table parameter and describing relative position data of the reference axis and the control axis, and a lower program for executing an INITs command described in the sub program. The position data table sets positional data as a command position of the control axis for every timing of the reference axis so that the control axis for each channel may move along a particular locus.

The main program contains, besides ordinary NC codes, an electronic cam control command CRVTBL_N where N is a channel number and a LEADNNN(CCCC) command where NNNN is a channel number for specifying a synchronous channel and CCCC is an argument for specifying a position data table to be referred by the LEAD command. Since the original NC program is replaced by such electronic cam program, the corresponding operation is executed by electronic cam control. That means, the LEADNNN(CCCC) command serves to move the control axis on a particular track at a timing of the reference axis. Once the command is executed, the operation continues until data in the referred position data table are wholly executed.

The CRVTBL_N command is a command for loading the position data table of the channel N into the numerical control device. All the succeeding programs are simultaneously loaded into the numerical control device, that is the main program, the sub program, and the lower program for executing a command in the sub program.

The LEADNNN(CCCC) is a command for executing the position data table CCCC set for the control axis assigned to a channel N. Particularly, the command is, for example, described as LEAD123(xxxx) for 3 (three) channels, LEAD12(xxxx) for 2 (two) channels, and LEAD1(xxxx) for a single channel. A position data table designated by the argument CCCC for the control axis assigned to each channel is executed. If the machine has 4 (four) channels, the allowable number of channels for simultaneous designation would be 4 (four). The position data table is provided for each of the control axes X, Y, Z, and C set for each channel.

The sub program contains declared parameters specified for the tables of several kinds to be used in each channel. A position data table is one of the several kinds of tables. Each parameter is described in the form of INI_Tabxxxxx. When a particular numeric value other than 0 (zero) is substituted for the parameter, a table to be used for the operation is effectively declared. If a particular table is not declared, 0 (zero) is substituted or the table parameter by itself is not declared. The sub program further contains an INITs command. The INITs command triggers an execution of a lower program in which the table corresponding to the effectively declared table parameter is brought into effect. In other words, a table to be read is specified. As a reference axis value is increased, a table value corresponding to the reference axis value is executed.

Since the reference axis value is started to be increased just when the processing of LEADNNN(CCCC) is started in the numerical control device, the status of the reference axis is monitored by the lower program executing the INITs command. (The INITs command is executed in the background of the LEADNNN(CCCC) command.) Particularly, after a particular reference axis value in various tables including a position data table is reached, a command in the table corresponding to the particular reference axis value is read to monitor the progress of operation of each table.

The INITs command detects a variation in the reference axis value and accordingly applies the value to the command relating to a table such as a command table. Since the program for processing the table does not monitor the reference axis value, it does work only when the reference axis value is given from the INITs command.

Figure 10:
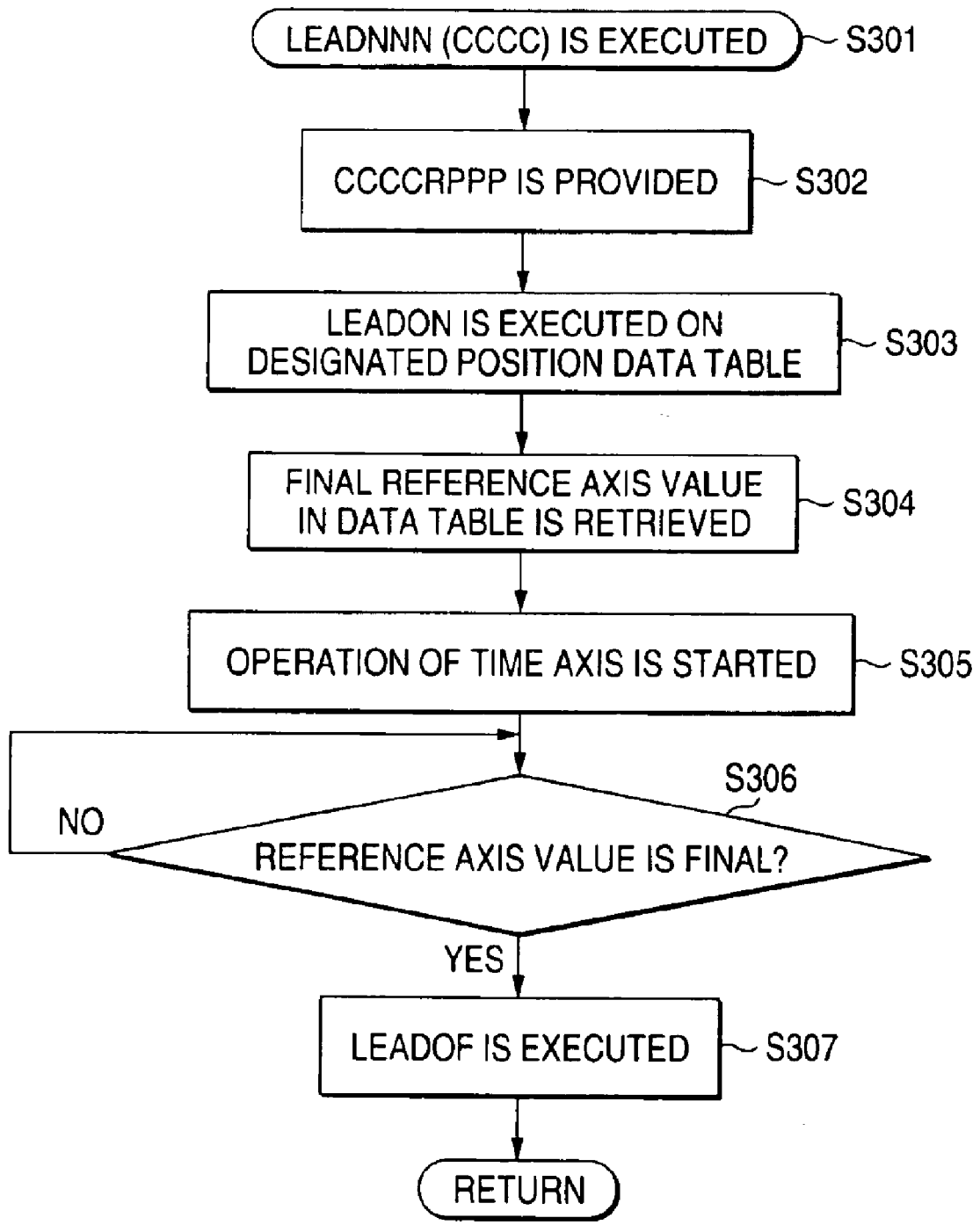
FIG. 10 is a flowchart showing how the position data table is processed by LEADNNN(CCCC) command.

FIG. 10 is a flowchart showing how the position data table is processed by the LEADNNN(CCCC) command.

In S301, the LEADNNN(CCCC) command is interpreted and executed after the M20 code is executed during execution of the main program of FIG. 9.

In S302, an argument CCCCRPPP which identifies a position data table is provided for the control axis X, Y, Z, and C for each channel, where R is a back up parameter and PPP is an axis number specifying a particular axis. The position data table is thereby specified for the control axis for a particular channel.

In S303, the LEADON command is executed on the position data table specified by the argument CCCCRPPP. This makes the control axis for each channel synchronous with the reference axis as a tracking axis. The program module is provided with the name of the control axis, the name of the reference axis, the position data table number specified by CCCCRPPP, and a flag for specifying the processing method of the LEADON command.

The LEADON processing provides a position command for each control axis on the basis of the reference axis value of the position data table described in the sub program and the position command value of the control axis defined for the reference axis value. The position command is a format command for the CTABDEF command (table name described by the reference axis, the tracking axis and CCCCRPPP).

In S304, the final reference axis value in the referred data table is retrieved.

In S305, operation of a time axis (which is an initial reference axis in this embodiment) is started.

In S306, it is determined whether the retrieved reference axis value is the final in the table. If it is not the final value, S306 is repeated. If it is the final value, the process goes to S307.

In S307, the LEADON is terminated by execution of LEADOF. This terminates the synchronous operation of the control axis with the reference axis. The program module is provided with the same arguments as the LEADON processing. In this embodiment, these programs are executed for screw-thread cutting. Until LEADON is executed in S303, the target control axis is also operable on the basis of the time axis as the reference axis as other control axes do. Until LEADOF is executed in S306, the control axis is controlled by the reference axis on the basis of the spindle rotation angle.

Figure 11:
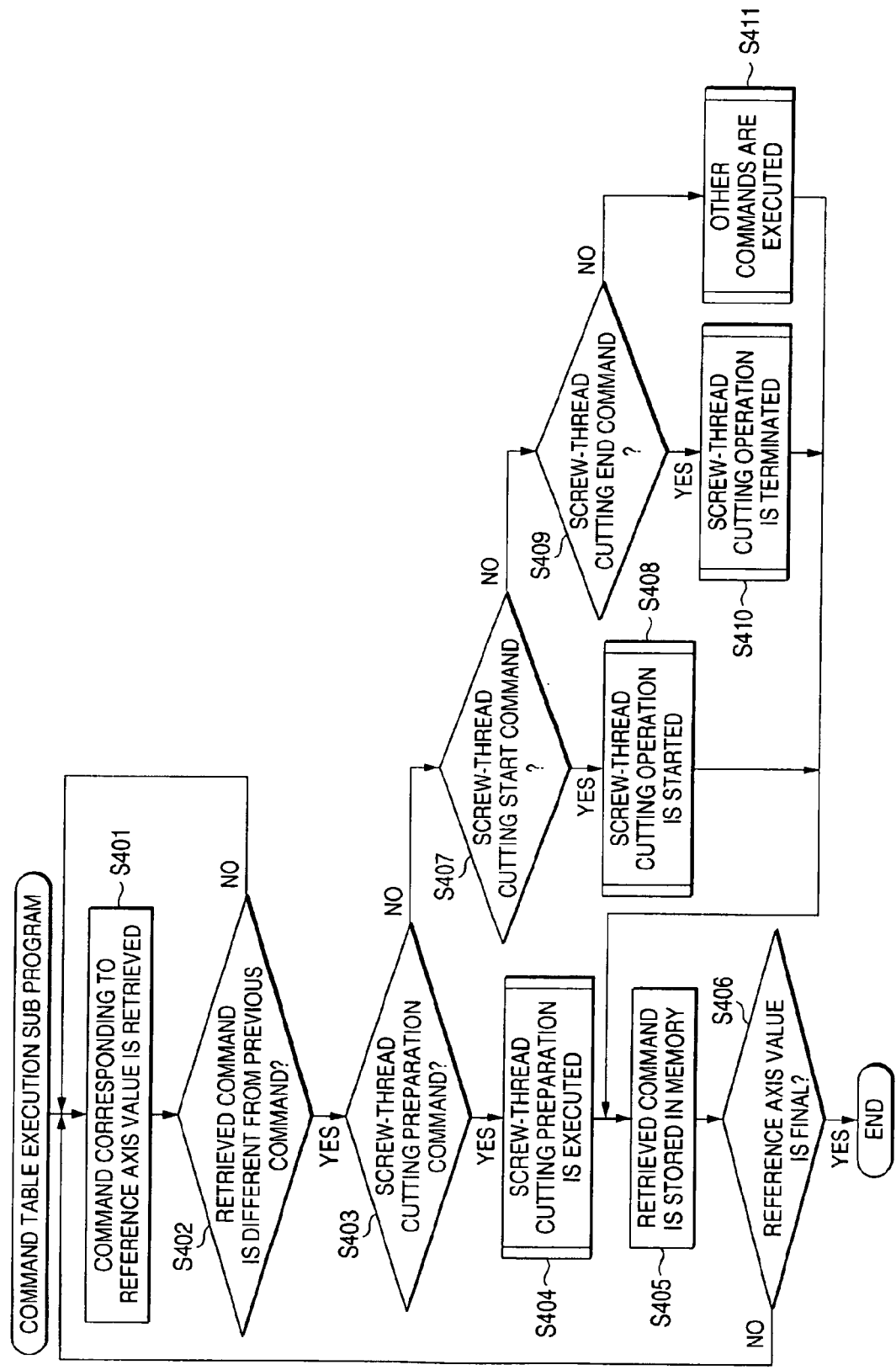
FIG. 11 is a flowchart showing an operation of a command table execution sub program

FIG. 11 is a flowchart showing sub program for command table execution. This program is executed in the numerical control device simultaneously with the operation of LEADNNN(CCCC) in FIG. 10.

In S401, a command corresponding to the reference axis value is retrieved from the command table.

In S402, it is determined whether the retrieved command is different from the command previously retrieved. If not, the process returns to S401. If it is different, the process goes to S403.

In S403, it is determined whether the retrieved command is a screw-thread cutting preparation command. If so, the process goes to S404.

Figure 12:
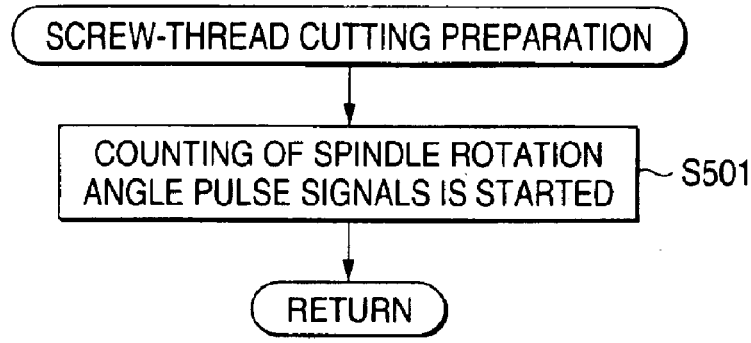
FIG. 12 is a subroutine of FIG. 11 showing a screw-thread cutting preparation.

In S404, the screw-thread cutting preparation is executed. This operation is described later (FIG. 12).

In S405, the retrieved command is stored in the memory.

In S406, it is determined whether the retrieved reference axis value is the final in the table. If yes, the program is completed, and if no, the process returns to S401.

On the other hand, if it is determined that the retrieved command is not a screw-thread cutting preparation command in S403, the process goes to S407.

In S407, it is determined whether the retrieved command is a screw-thread cutting start command. If yes, the process goes to S408.

Figure 13:
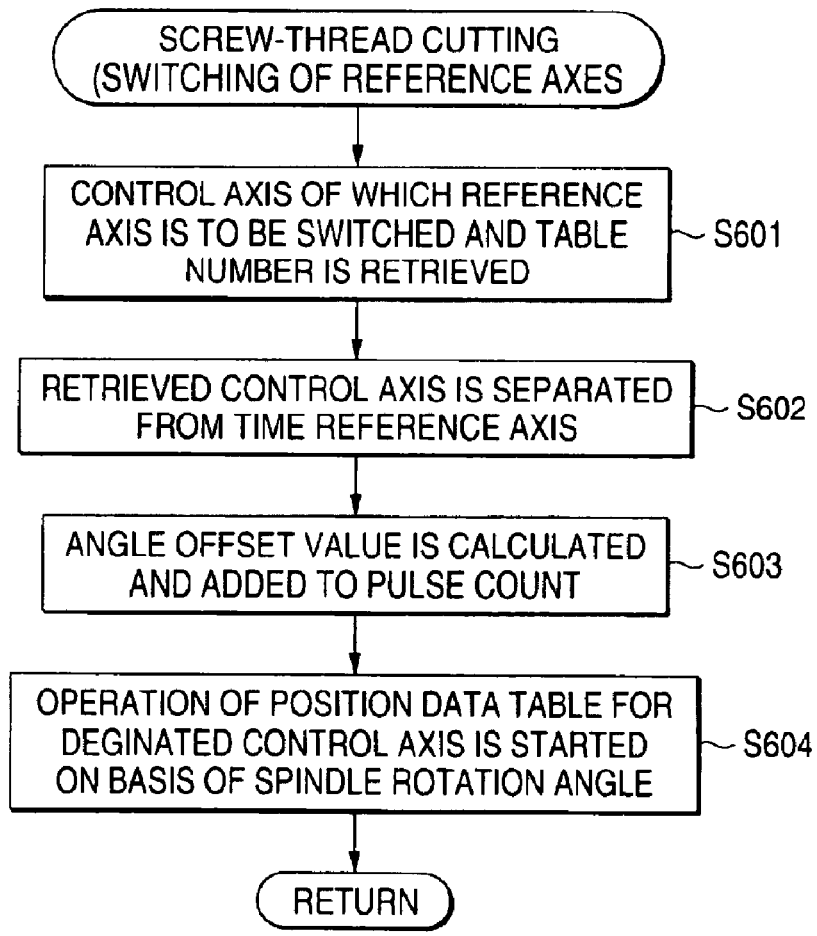
FIG. 13 is a subroutine of FIG. 11 showing a screw-thread cutting operation.

In S408, a screw-thread cutting operation is started. This operation is described later (FIG. 13). When S408 is done, the process goes to S405 and then S406 as described above.

On the other hand, if it is determined that the retrieved command is not a screw-thread cutting start command, the process goes to S409.

In S409, it is determined whether the retrieved command is a screw-thread cutting end command. If yes, the process goes to S410.

Figure 14:
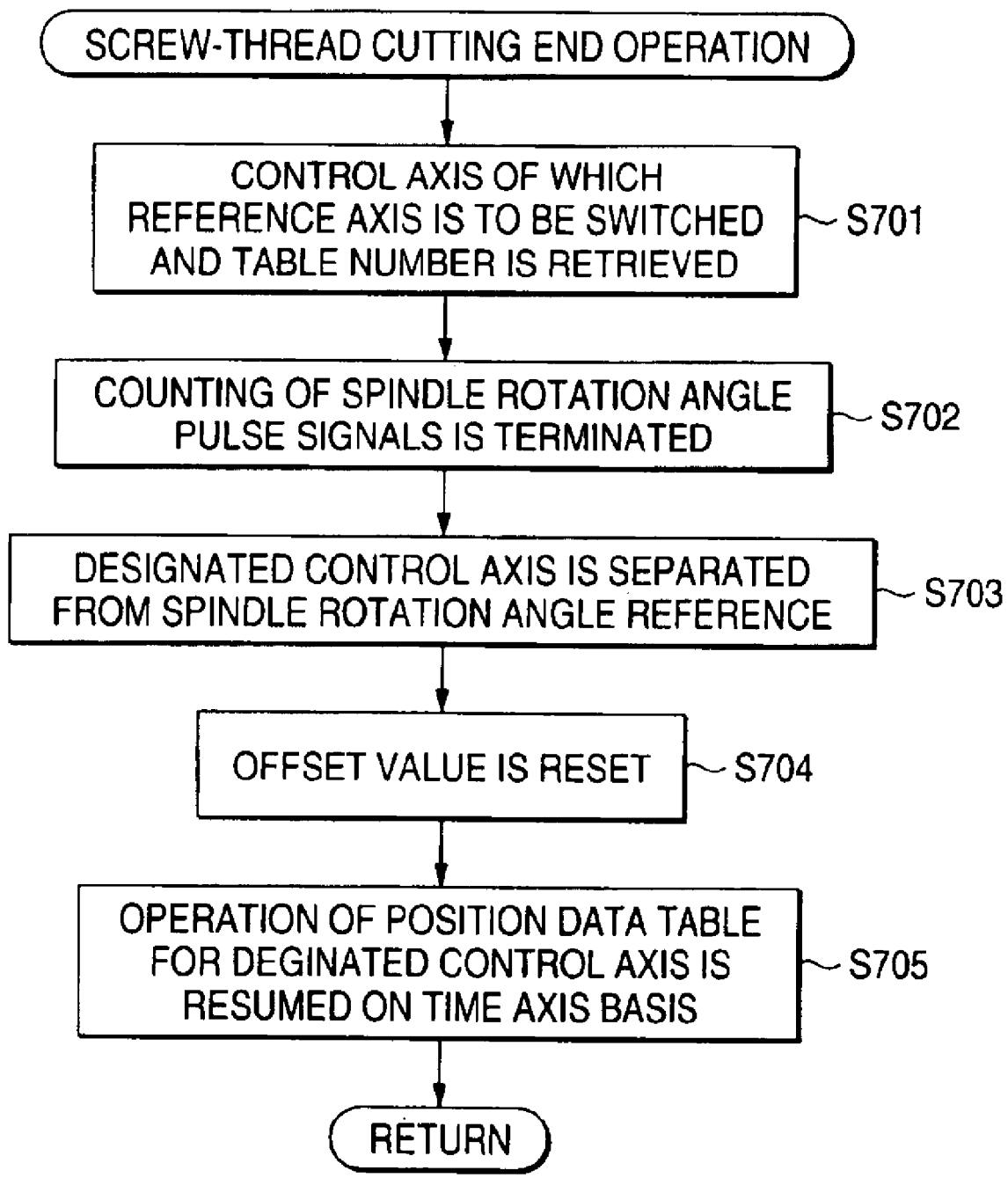
FIG. 14 is a subroutine of FIG. 11 showing a screw-thread cutting end operation.

In S410, a screw-thread cutting operation is terminated. This operation is described later (FIG. 14). When S410 is done, the process goes to S405 and then S406 as described above.

On the other hand, if it is determined that the retrieved command is not a screw-thread end command in S409, the process goes to S411.

In S411, other commands are executed.

FIG. 12 is a flowchart showing a subroutine of the screw-thread cutting preparation in S404.

In S501, counting of spindle rotation angle pulse signals is started. When S501 is completed, the process goes to S405.

FIG. 13 is a flowchart showing a subroutine of the screw-thread cutting operation in S408.

In S601, a control axis of which reference axis is to be switched and a table number of the position data table specified for the control axis are retrieved.

In S602, the retrieved control axis is separated from the time reference axis. This means that the operation of the control axis on the basis of the time axis is stopped.

In S603, an angle offset value is calculated and the calculated value is added to the pulse count in S501.

The pulse count is adjusted to be consistent with the initial value of the reference axis described in the position data table so that the operation of the tool post is performed at cutting start rotation angle required before starting screw-thread cutting. This allows a screw to be machined with higher accuracy.

In S604, the position data table of the table number corresponding to the retrieved control axis is started on the basis of spindle rotation angle. The process then goes to S405.

FIG. 14 is a flowchart showing a subroutine of the screw-thread cutting end in S410.

In S701, a control axis of which reference axis is to be switched and a table number of the position data table specified for the control axis are retrieved.

In S702, the counting of spindle rotation angle pulse signals is terminated.

In S703, the designated control axis is separated from the spindle rotation angle reference. This means that the operation of the control axis on the basis of the spindle rotation angle is stopped.

In S704, the offset value is reset.

In S705, the table for the designated control axis is resumed on the basis of the time axis. When the S705 is completed, the process goes to S405.

Figure 15:
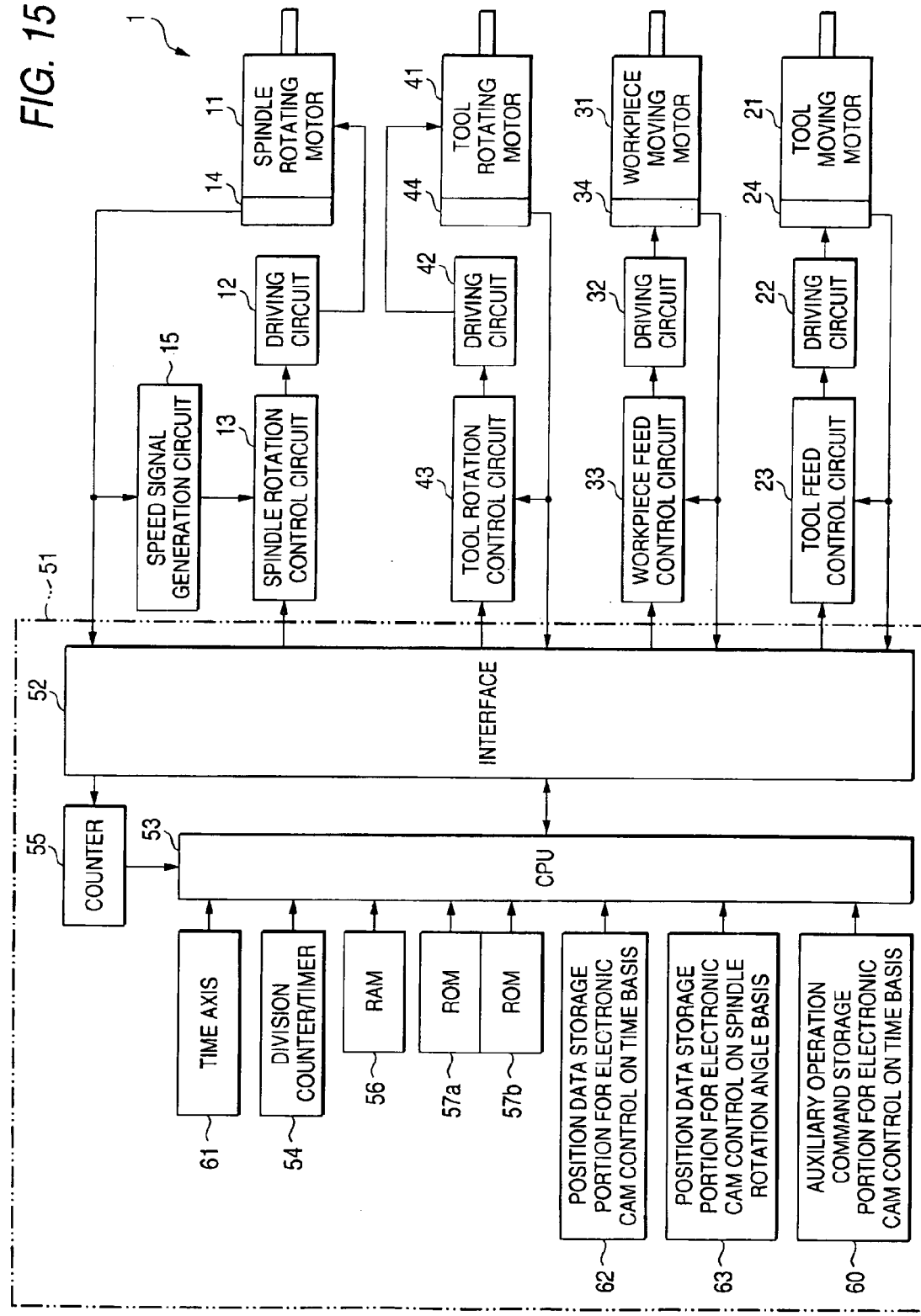
FIG. 15 is a block diagram showing a structure of a numerically controlled machine tool of the second embodiment.

FIG. 15 is a block diagram showing how the above described processing is executed in the machine tool 1. FIG. 15 is different from FIGS. 1 and 5 in that there provided a position data storage portion for electronic cam control on the basis of time 62, a position data storage portion for electronic cam control on the basis of spindle rotation angle 63, an auxiliary operation command storage portion for electronic cam control on the basis of time 60, and a time axis 61. The explanation is being omitted for the common parts as in FIGS. 1 and 5. The time axis 61 constitutes the second reference axis as defined in the claims. The position data storage portion for electronic cam control on the basis of time 62 is a memory for storing a command position of the control axis in response to a reference axis value when the time axis is used as the reference axis. The position data storage portion for electronic cam control on the basis of time 62 constitutes the second position data storage means as defined in the claims. The position data storage portion for electronic cam control on the basis of spindle rotation angle 63 is a memory for storing a command position of the control axis in response to a reference axis value when the spindle rotation angle is used as the reference axis. The position data storage portion for electronic cam control on the basis of spindle rotation angle 63 constitutes the first position data storage means as defined in the claims. The auxiliary operation command storage portion for electronic cam control on the basis of time 60 is a memory for storing an execution timing of the auxiliary operation command in response to a reference axis value when the time axis is used as the reference axis. The time axis is actually a position value obtained by monitoring the position of a hypothetical axis 61 operating at constant speed. The control axis is controlled by use of the position value. The hypothetical axis 61 is called as the time axis since time is calculated from speed and position. The hypothetical axis 61 is started to move when the LEADNNN(CCCC) command is executed. The moving position is monitored as the reference axis value. Accordingly, position data of the control axis described in the position data table is read by the CPU 53. As for the spindle rotation angle as the reference, a signal from the pulse encoder 14 is inputted to the counter 55 via the I/F 52, and the count is monitored by the CPU 53 as the reference axis value. Accordingly, a command position of the corresponding control axis is read.

Figure 16:
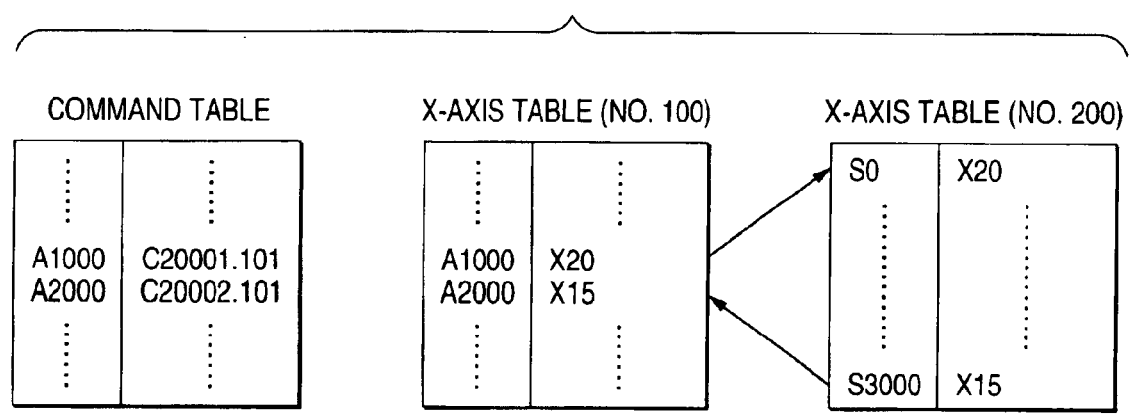
FIG. 16 is command table and position data table in the converted program in the second embodiment.

As described above, there are two reference axes provided: time axis and spindle rotation angle. FIG. 16 shows a command table and position data tables comprising an X-axis table (No. 100) and an X-axis table (No. 200). A command position of the X-axis such as "X20" is set for each block such as "A1000" and "S0". In the "A1000" block of the command table, a switching command from time axis to spindle rotation angle is described. In the "A2000" block of the command table, a switching command from spindle rotation angle to time axis is described. Switching of the reference axes is executed by the numerical control device by these relevant commands.

Switching of the reference axes may be preferably preceded by counting of spindle rotation angle pulse signals as in FIG. 12 to properly achieve a desired machining operation. This is done to secure time for transition into the designated number of rotations of the spindle for screw-thread cutting when the screw-thread cutting start command is issued. The S504 operation may be replaced by another method as far as the intended purpose is attained. For example, it may be simply determined whether the number of spindle rotations reaches the desired value. A stable operation of the tool post or the headstock is not guaranteed at a higher value than the designated number of spindle rotations. Further, it possibly cannot respond to variation in rotation. It would result in inferior quality of the finished product. This invention prevents such possible problems.

After the screw-thread cutting start command is executed as in FIG. 13, the designated control axis is separated from the time axis for transition into control on the basis of spindle rotation angle. As shown in S603, the angle offset value is calculated and the calculated value is added to the pulse signal count of spindle rotation angle. Particularly, it is done by the following formula.

(Angle Offset)=(Current Spindle Angle−(Cutting Start Angle)$MOD$360)×(Spindle Rotating Direction)−360−Current Count Value Current Spindle Angle is an angle of reference position of the spindle with respect to the measurement standard.

Cutting Start Angle is an angle by which a machining operation is started on a designated workpiece.

Spindle Rotating Direction: Forward=1, Reverse=−1

Current Count Value is an accumulated count value after pulse counting is started in S501.

Since the count value of the current spindle rotation angle is modified by the calculated offset value, the accumulated count value from the preparation stage is reset to 0 (zero). The rotational position of the spindle is calculated to be basically on the minus side with respect to the cutting start angle so that the current count becomes 0 (zero) when the rotational position of the spindle reaches the cutting start angle.

When the current count becomes 0 (zero), the operation is started toward, for example, the control axis position X20 corresponding to S0 in FIG. 16. A screw as depicted in the drawing is thus fabricated with accuracy.

S407 constitutes switching timing determining means as defined in claims. S601 to S604 and S701 to S705 constitute reference axis switching means as defined in claims.

As described above, the reference axes are actually switched only after a switching timing is properly determined and an adjustment for switching is properly performed. Therefore, switching of the reference axes is properly effected and a desired operation is achieved with higher accuracy and higher speed. Further, the reference axes may be appropriately switched according to the type of operation, so speed and accuracy can be both achieved at higher level.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A machine tool for machining a workpiece into a desired shape by a tool which is capble of operating an axis control by moving or roatating at least one of the workpiece and the tool, obtaining a reference axis value on the basis of a predetermined reference and outputting a data for a position command stored corresponding to the obtained reference axis value, comprising:

a first reference axis for generating the reference axis value as a reference timing signal every unit moving of the predetermined axis;

first position data storage means for storing position data set respectively corresponding to a plurality of reference axis values on the basis of the first reference axis, the position data representing a moving position of at least one of the workpiece and the tool;

a second reference axis for generating reference timing signal independently of unit moving of the predetermined axis;

second position data storage means for storing position data set repectively corresponding to a plurality of reference axis values on the basis of the second reference axis, the position data representing a moving position of at least one of the workpiece and the tool;

moving position defining means for defining a moving position of at least one of the workpiece and the tool by reading position data set for every reference axis value stored in one of the first position data storage means and the second position data storage means;

switching timing storage means for storing a sign corresponding to the first reference axis value, the sign representing a timing for switching a reference axis to use when the moving position defining means defines the moving position;

switching timing determining means for determining the timing for switching between the moving position definition by the reference axis value on the basis of the first reference axis and the moving position definition by the reference axis value on the basis of the second reference axis when the first reference axis value becomes a predetermined reference axis value so that the sign representing the timing for switching is read from the switching timing storage means; and reference axis switching means for switching, in response to the switching timing determining means, the moving position definition on the basis of the first reference axis and the moving position definition on the basis of the second reference axis.

2. The machine tool as claimed in claim 1 further comprises rotation stop presuming means for presuming that the predetermined axis stops rotation, and rotary tool driving means for controlling the rotary tool until it reaches a target number of rotations when it is presumed by the rotation stop presuming means that the predetermined axis has stopped rotation.

3. The machine tool as claimed in claim 1, further comprises initialization means for bringing the reference axis value output from the second reference axis which is set to read the position data from the second position data storage means to the initial reference axis value stored in the second position data storage means prior to operate the axis control by the position data stored in the second position data storage means after the switching timing determining means determined the timing for switching.

4. The machine tool as claimed in claim 1, further comprises necessity of switching determining means for determining whether the sign representing the timing for swithching the reference axis that the moving position defining means uses for defining the moving position is stored in the switching timing storage means.

5. The machine tool as claimed in claim 1, further comprises a transformer which transforms a program so that each data stored in the first position data storage means, the second position data storage means, and the switching timing storage means are corresponded to the reference axis value and at least a part of NC program that is made to machine the workpiece into a desired shape is transformed and stored.

* * * * *